United States Patent [19]
Ryan

[11] 3,816,833
[45] June 11, 1974

[54] AIRCRAFT ADF WITH DIGITAL FREQUENCY DISPLAY AND TIMER

[75] Inventor: Donald P. Ryan, Bloomfield, N.J.

[73] Assignee: Edo-Aire, A Division of Edo Corporation, Fairfield, N.J.

[22] Filed: Sept. 15, 1971

[21] Appl. No.: 180,726

[52] U.S. Cl............................................. 343/113 R
[51] Int. Cl................................................. G01s 3/04
[58] Field of Search................................. 343/113 R

[56] References Cited
UNITED STATES PATENTS
| | | | |
|---|---|---|---|
| 3,060,427 | 10/1962 | Jaffe et al. | 343/113 R X |
| 3,244,983 | 4/1966 | Ertman | 325/455 |
| 3,681,707 | 8/1972 | Bean | 343/113 R X |

Primary Examiner—Benjamin A. Borchelt
Assistant Examiner—Richard E. Berger
Attorney, Agent, or Firm—Richards, Harris & Medlock

[57] ABSTRACT

An automatic direction finder for air navigation systems has an electronic pulse counting system with a frequency mode for providing a digital display of the frequency to which the radio is tuned and a timing mode which displays minutes and seconds. The count is visually displayed by a digital display unit. The counting system includes a series of pulse counters connected through a gating circuit to a local oscillator and a timing signal generator. The gating circuit passes timing pulses or pulses representing the radio frequency to the pulse counters, depending upon a predetermined selection of a time mode or a frequency mode, respectively. Decoding devices convert the count to a signal readable by the digital display unit. Logic circuitry resets and preloads the pulse counters and gates the output of the pulse counters to the decoding devices.

6 Claims, 4 Drawing Figures

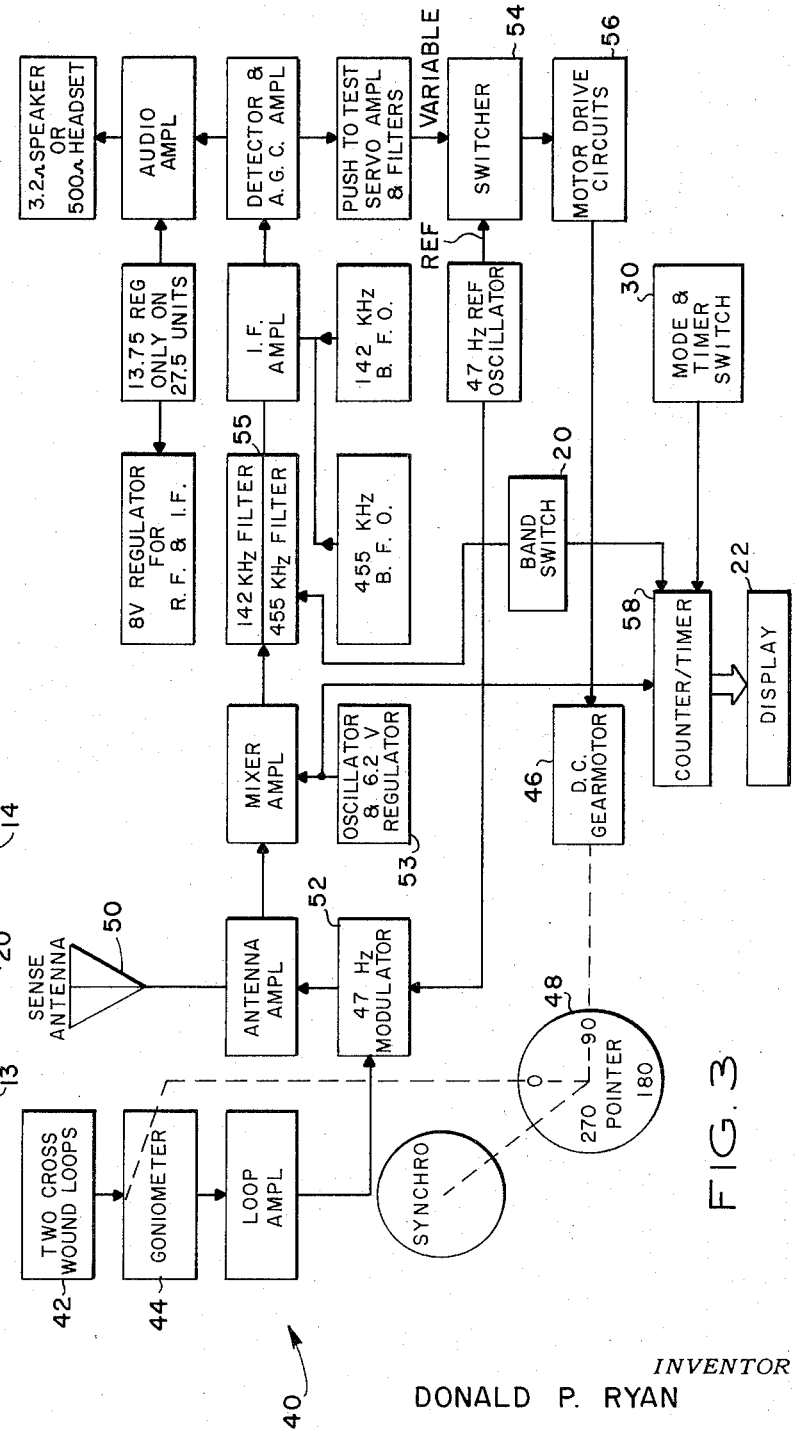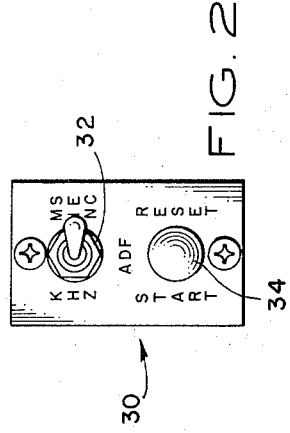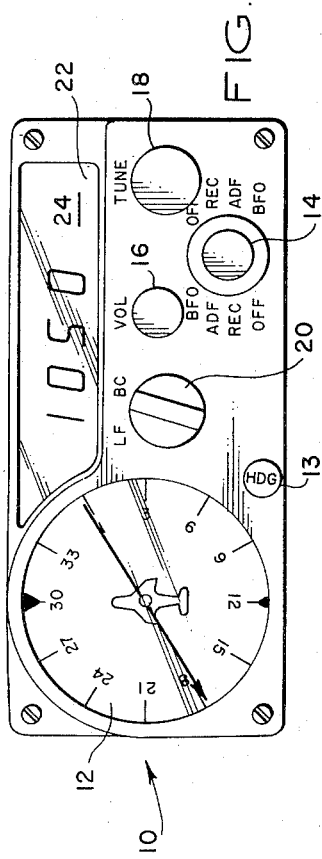

AIRCRAFT ADF WITH DIGITAL FREQUENCY DISPLAY AND TIMER

BACKGROUND OF THE INVENTION

This invention relates to automatic direction finders, and more particularly, relates to an aircraft automatic direction finder having a digital readout of the frequency to which the radio is tuned and, alternatively, a stop-watch type timing mode which displays minutes and seconds.

Most aircraft now in use, including general aviation aircraft, are equipped with an automatic direction finger (ADF) for radio navigation. The ADF is tuned to the standard broadcast band to provide a bearing to a known broadcast station, or to a low frequency non-directional radio beacon established specifically for air navigation. ADF radios have generally been capacitively tuned in an analog manner using a manually operated tuning knob which is also mechanically coupled to a calibrated dial.

This type of tuning system is not reliable for tuning the radio to a selected station without receiving an audio identification of the station. For standard broadcast stations, the station identification is repeated only a few times each hour. If the identification proves to be incorrect, the tuning procedures must be repeated. In higher speed aircraft this delay can be a significant problem. Non-directional radio beacons usually broadcast station identification by Morse code continuously. Although there is no delay in identifying the station once the station can be audibly received, most non-directional navigation beacons used with instrument landing systems are relatively low power and can only be received at distances somewhat less than 50 miles. As a result, a pilot making an instrument approach has a relatively short period of time in which to tune in the outer compass locator and identify the station before making an approach. The tuning operation requires considerable attention by the pilot and invariably occurs when the pilot's time is occupied by the air traffic controller. In turbulent weather the task of tuning the radio becomes very difficult because of abrupt forces on the arm that is extended to manipulate the tuning knob.

These problems have been solved for commercial type aircraft by using digitally tuned ADF's. This type of ADF utilizes either crystal controlled tuning, or frequency sensitized tuning, so that the frequency can be preselected with accuracy prior to receiving an audible identification signal. However, this equipment has heretofore been relatively expensive, heavy and generally not practical for use in general aviation aircraft, although the cost of this type of ADF has been decreasing.

It is also important in air navigation to be able to accurately time certain intervals of flight. For example, during holding patterns and in the procedure turns of an instrument landing procedure, a pilot must fly a particular heading for a relatively precise period of time before turning to a new heading. An accurate clock with a sweep second hand is a mandatory instrument for an IFR equipped aircraft. Many pilots utilize mechanical stopwatches for this purpose.

Radio receiver systems of the recent prior art have improved the frequency solution of such systems by providing a digital display of the tuned frequency. A typical system of this type is shown in U.S. Pat. No. 3,244,983 granted to R. J. Ertman. The frequency is counted periodically by a set of decimal counting units, and the count is digitally displayed. However, such devices have been complex and have not previously been employed in automatic direction finder systems. Digital systems have also been heretofore employed as time pieces to count and digitally display time.

SUMMARY OF THE INVENTION

This invention relates to an improved automatic direction finding radio which has both a frequency readout mode for tuning and a time readout mode for timing purposes. A mode selection switch and a start-reset timing switch are located for the convenience of the pilot. The ADF not only combines two important navigational functions in one system, but significantly improves the performance of both functions. The ADF may be pretuned to a desired station with precision, without receiving an audio identification signal. The ADF has no contacts associated with the tuning circuit and therefore has a long and maintenance free life. The timing mode provides the ideal stop-watch capability with an improved display.

More particularly, in the preferred embodiment of the present invention, there is provided in combination with an automatic direction finder system, an electronic pulse counting system for counting time based pulses and a radio frequency. Gating circuitry directs electronic pulses to a plurality of series-connected pulse counters. The pulses are representative of either a timing frequency provided by a signal generator or a radio frequency provided by a radio wave receiver, in accordance with a predetermined selection of either a time mode or a frequency mode, respectively. The resulting count is visually displayed by an array of digital display devices. Logic circuitry utilizes the pulses representative of the timing frequency to control the operation of the pulse counters and the display devices.

In the frequency mode the pulse counters are set to zero during a reset cycle. Then during a preload cycle the counters are loaded to a count value such that the intermediate frequency of the radio wave receiver is automatically subtracted out of the frequency count during a count cycle which follows the preload cycle. Finally, in a read cycle, the frequency count is gated to the digital display devices where it is shown in kilohertz. These cycles are continually repeated while the pulse counting system operates in the frequency mode, thereby displaying different frequencies as the ADF system is tuned.

In the time mode the pulse counters are initially set to zero. The counters count the time pulses substantially gated to them. The changing count of pulse counters is continually displayed in minutes and seconds by the digital display unit. A reset button provides a means to manually reset the counters to zero.

BRIEF DESCRIPTION OF THE DRAWINGS

For a more complete understanding of the present invention and for further objects and advantages thereof reference may now be hade to the following description taken in conjunction with the accompanying drawings in which:

FIG. 1 is a front view of the instrument panel, including the digital display unit, in the automatic direction finder system;

FIG. 2 is a front view of the mode selector switch and start/reset button used in connection with the pulse counting system;

FIG. 3 is a block diagram of the automatic direction finder system including the electronic pulse counting and display units.

DESCRIPTION OF THE PREFERRED EMBODIMENT

Figure 4:
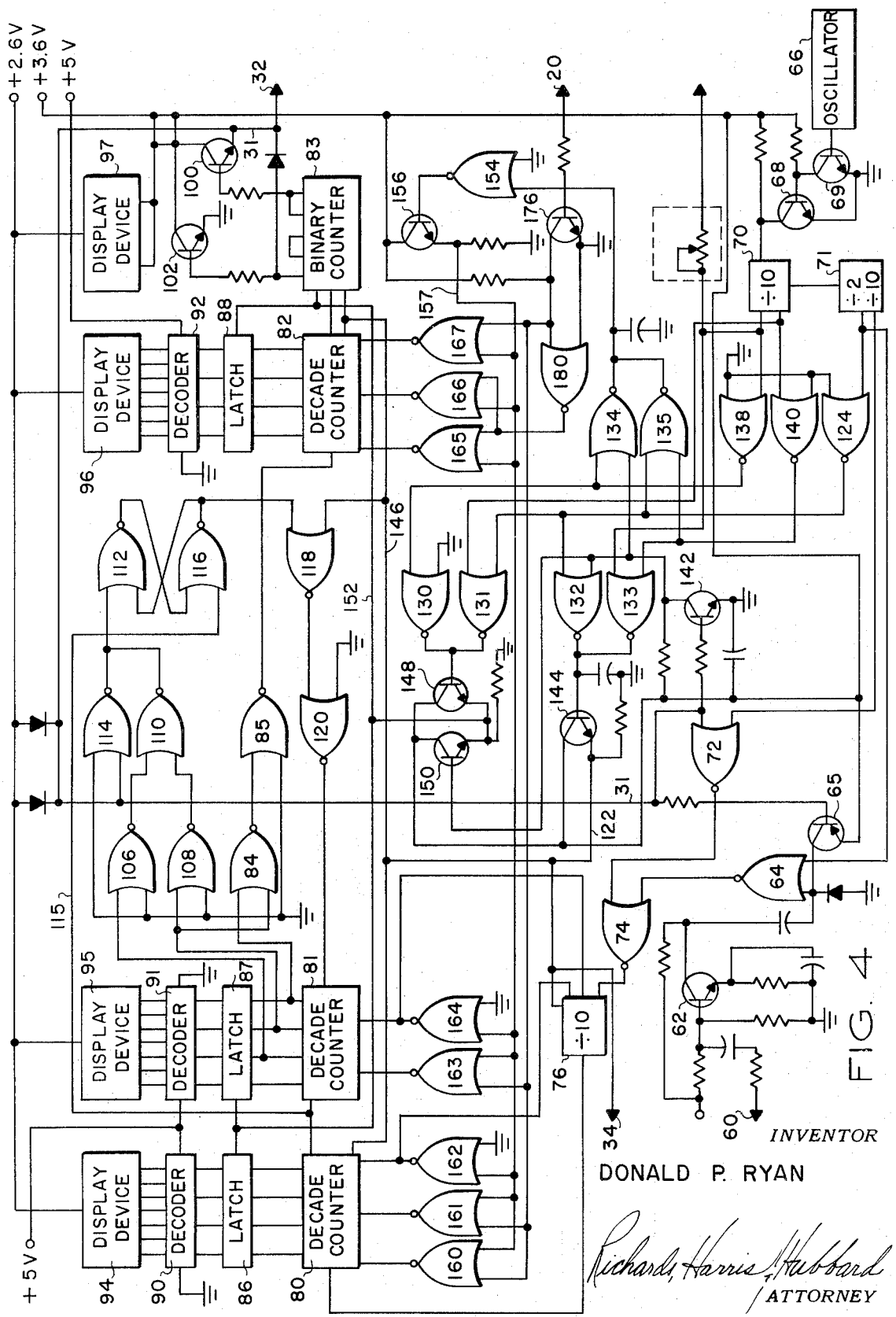
FIG. 4 is a circuit diagram of the electronic pulse counting and display system.

Referring now to FIG. 1, an automatic direction finder (ADF) instrument panel is indicated generally by the reference numeral 10. A conventional air navigation compass card 12 is positioned on one side of the instrument panel 10 for indicating the aircraft heading. A heading knob 13 is positioned nearby to rotate the compass card 12. A standard mode selector knob 14 is provided for choosing the desired conventional mode of operation. The selector knob 14 is used to turn the unit off, select the REC (receiver) MODE, SELECT THE ADF (automatic direction finder) mode, or select the BFO (beat frequency output) mode.

Conventional volume and tuning knobs 16 and 18, respectively, are positioned on the instrument panel for adjusting the volume and tuning the frequency of the radio receiver. A band selector switch 20 is provided to allow selection of a low band (LF) or a high band (BD) when tuning.

A digital display unit 22 is mounted near the top of the instrument panel 10. The digital display unit 22 incorporates four segmented display devices (best shown in FIG. 4) made from light emitting components such as gallium phosphide red light-emitting diodes. Two dots (not shown) between the second and third digits of the display unit are also made from light emitting components. Automatic dimming may be provided with a photocell and differential amplifiers (not shown). A dimmer pot (not shown) may also be used to manually adjust the light intensity of the display unit 22 according to the ambient light. Full brightness of the display unit 22 may be obtained with about 2.4 volts bias, and the lowest intensity may be at about 2.0 volts. A red filter 24 masks both the display unit 22 and the photocell.

FIG. 2 shows a combination mode and timer switch 30 which may be mounted in a convenient location in a position convenient to the pilot. Mode switch 32 is a conventional two-position toggle switch which is used to select the frequency mode or time mode of operation for the counting and display system. The frequency mode is selected by moving mode switch 32 to the KHZ position, and the MIN SEC position selects the time mode. Button 34 is a push-on, push-off type switch for starting and resetting the counters and display unit 22 while operating in the time mode.

When operating in the frequency mode, the display unit 22 indicates the exact frequency in kilohertz to which the receiver of the ADF system is tuned. When operating in the time mode, the ADF system continues to receive a selected frequency and to operate in the conventional manner. When button 34 is first pushed, the display unit 22 shows the time, in minutes and seconds, which has elapsed from the moment the button was pushed to start the timer. The dots previously mentioned are illuminated to separate the minutes and seconds. Upon reaching 19 minutes and 59 seconds the count recycles to zero and resumes counting. When the button 34 is again pressed to reset the timer, 0:00 is displayed until the button is pressed to start the timer again.

In FIG. 3, a conventional ADF system 40 is shown connected to the counter/timer display system of the present invention. ADF system 40 may be of the type manufactured by Edo-Aire, a division of Edo Corporation in Fairfield, New Jersey, and shown in "instruction Manual, R-556" published by Edo-Aire.

The R-556 Automatic Direction Finder (ADF) system 40 employs a very sensitive receiver covering the frequency range from 185 kilohertz to 1750 kilohertz in two bands. Aircraft radio and marine beacons, as well as standard broadcast stations, may be used for ADF mode operations.

In ADF system 40 a ferrite loop 42 is of crossed loop design with no moving parts. Loop 42 is coupled to a goniometer 44 which provides the proper station direction by comparing the signals received from the crossed loops 42. If there is no null, a motor 46 automatically drives the goniometer 44 to null. At this point, an indicator 48 will be on bearing to the station. The loop 42 has a built in quadrantal error correction factor of 6 to 7 degrees to compensate for the error caused by the shape of the aircraft.

The signal from the goniometer is shifted 90° to put it in phase, or 180° out of phase, with a sense antenna signal 50.

At this point, the combined signal is modulated with a 47 hertz signal by a modulator 52. After radio frequency and intermediate frequency amplification and detection, the 47 hertz signal is adjusted to be in phase or 180° out of phase with the reference 47 hertz signal. This combined signal shuts off one of two control transistors in a switcher 54 depending upon the phase relationship of the demoulated 47 hertz signal to the reference phase. The control transistors 54, in turn, switch on motor drive transistors 56 which power the motor 46 in the correct direction to move the pointer 48 to null.

Two I.F. filters are used in the R-556 unit. For the low band 142 kilohertz is provided for sharp selectivity and channel separation. 455 kilohertz is used on the high band to provide better quality sound for the standard broadcast band. The unit is fully transistorized and temperature compensated.

The output of local oscillator 53 feeds into a counter/timer circuit 58. Circuit 58 is also connected to mode and timer switch 30 and to I.F. filter 55 by way of band switch 20. The output of counter/timer circuit 58 feeds to the display unit 22.

The counter/timer circuit 58 measures the oscillator frequency when in the frequency mode and counts time in minutes and seconds during the time mode. The selection of mode is made using mode and timer switch 30, shown in more detail in FIG. 2. In the frequency mode the counter timer circuit 58 subtracts out the intermediate frequency of the ADF system 40. Band switch 20 selects the I.F. frequency to be added in the ADF system 40 and subtracted out by the counter/timer 58. Display unit 22, also shown in FIG. 1, digitally displays the output of the counter/timer 58.

Referring now to FIG. 4, the circuitry for counter/timer 58 and display unit 22 is shown in greater detail. A pin 60 brings the input signal from local oscillator 53 to the base of a transistor 62 whose output is connected to an input of NOR gate 64. The same input to gate 64 is also connected to the output of transistor 65 whose base is connected to mode switch 32. The other input to NOR gate 64 comes from a timing oscillator 66 through squaring transistors 68 and 69 and decade counters 70 and 71. The divide-by-ten output of decade counter 71 feeds an input of NOR gate 72. The other input of NOR gate 72 is connected to the mode switch 32 by line 31. The output of NOR gate 72 is connected to an input of NOR gate 74, with the other input coming from NOR gate 64. The output of NOR gate 74 feeds through a decade counter 76 to four series-connected pulse counters 80–83.

The output of decade counter 80 is connected to decade counter 81 which in turn is connected through NOR gates 84 and 85 to decade counter 82. The output of counter 82 is connected to binary counter 83. The state of decade counter 80 is communicated by four output lines through a latch 86 to a decoder 90. The output of decoder 90 is in turn connected by seven output lines to a display device 94. Similarly the outputs of decade counter 81 are connected through a latch 87 and a decoder 91 to a display device 95. Likewise the state of decade counter 82 is communicated through a latch 88 and a decoder 92 to a display device 96.

Binary counter 83 is composed of two series connected J-K flip-flops (not shown). The Q output of the first flip-flop is connected to the base of a transistor 100, and the Q output of the second flip-flop is connected to the base of a transistor 102. The mode switch 32 is connected to the emitter of transistor 100 and the base of transistor 102. The emitter of transistor 102 is grounded. The collector outputs of transistors 100 and 102 are both connected to the input of a display device 97.

Two outputs between decade counter 81 and latch 87 feed through inverters 106 and 108, respectively, to separate inputs of a NOR gate 110. The output of NOR gate 110 is connected to the input of a NOR gate 112. The same input of NOR gate 112 is also connected through an inverter 114 to mode switch 32. The other input to NOR gate 112 comes from the output of a NOR gate 116 which forms a flip-flop with gate 112. The output of NOR gate 112 feeds to one input of gate 116. The other input to gate 116 comes from the output of decade counter 80 which leads to decade counter 81. The output of gate 116 passes through a NOR gate 118 and an inverter 120 to decade counter 81. The other input to NOR gate 118 is connected to line 146 which leads to reset gates to be discussed later.

The timing of read NOR gates 130 and 131, reset gates 132 and 133 and preload gates 134 and 135 is controlled by timing oscillator 66. Oscillator 66 may be a conventional, precision one kilohertz oscillator driven by a piezoelectric tuning fork. The output of oscillator 66 is connected to the base of squaring transistor 69 whose output is connected to the base of squaring transistor 68. The emitters of both transistors 68 and 69 are connected to ground and the collectors are connected through resistances to 3.6 volts. The output of transistor 68 feeds into decade counter 70 whose output is connected to the input of decade counter 71.

The divide-by-two output of decade counter 71 is connected to gate 64 as mentioned earlier. The same output also feeds through inverter 124 to one input of each of NOR gates 131, 132 and 135. Counter 70 has two pin outputs which feed pulses at certain times during the count to ten. One pin output passes through an inverter 130 to one input of each of NOR gates 130 and 134. The other pin output of counter 70 is connected through an inverter 140 to one input of each of NOR gates 133 and 135.

The second input to read NOR gate 130 is connected to ground. The other input to read NOR gate 131 is connected directly to the output of counter 70 which feeds inverter 140. Mode switch 32 is connected by way of line 31 to the base of transistor 142 whose output is connected to the second inputs of both reset NOR gate 132 and preload NOR gate 134. The second input to reset NOR gate 133 is connected directly to the output of counter 70 which feeds inverter 138.

The outputs of reset gates 132 and 133 are both connected to the base of transistor 144. The output of transistor 144 is connected by way of reset line 146 to counters 80, 82 and 83 and to counter 81 through NOR gate 118 and inverter 120. Reset line 146 is also connected to counter 76 and reset button 34.

The outputs of read gates 130 and 131 are both connected to the base of transistor 148. The input to the base of transistor 150, which forms an OR gate with transistor 148, is connected through transistor 142 to the mode switch 32. The outputs of both transistors 148 and 150 are fed by way of line 152 to latches 86–88 and directly to binary counter 83. The combined outputs of preload gates 134 and 135 are fed through inverter 154 to the base of transistor 156. The output of transistor 156 is connected by way of line 157 to one input of each of NOR gates 160–167. The second input of each of NOR gates 160, 161, 163 and 167 is connected through transistor 176 to the output of band switch 20. The output of transistor 176 is also connected through inverter 180 to one input of each of NOR gates 165 and 166. The other input to each of NOR gates 162 and 164 is connected to ground.

The operation of the circuit shown in FIG. 4 will now be briefly described, first as to operation in the frequency mode and then in the time mode. In the frequency mode, the counter/timer circuit 58 preferably operates in four successive cycles, the timing of which is controlled by oscillator 66. During the count cycle, counters 80–83 receive pulses which are representative of the radio frequency to be counted. The input pulses to counter 80 come from gate 64 through gate 74 and decade counter 76.

Following the count cycle, successive read, reset and reload cycles occur within a period which is of equal length to that of the count cycle. During the read cycle, gates 130 and 131 are enabled which open latches 86–88. The outputs of counters 80–82 flow through latches 86–88 to decoders 90–92 and are displayed by display devices 94–96. Read gates 130 and 131 also activate binary counter 83 to feed its output through transistor 102 to display device 97.

In the next cycle, reset gates 132 and 133 input a reset signal to counters 80–83 which sets the counters to zero. During the reset cycle, the latches 86–88 and the flip-flops of counter 83 hold the previous state of counters 80–83 on the display devices 94–97.

Finally, in the preload cycle gates 134 and 135 send a preload signal through inverter 154 and transistor 156 to enable gates 160–167. Gates 160–167 feed an input signal from band switch 20 to counters 80–82 which preloads a value in counters 80–82 such that the intermediate frequency is subtracted from the count in the next count cycle.

In the time mode, gate 64 is turned off by mode switch 32 acting through line 31 and transistor 65. At the same time, NOR gate 72 is enabled to receive timing pulses from the divide-by-ten pin of decade counter 71. Timing pulses are fed through gate 74 and decade counter 76 to counters 80–83. During the time mode, read gates 130 and 131 are held on by a signal through transistors 142 and 150. In turn, latches 86–88 and transistor 100 are held open allowing continual display of the time count as it progresses.

During the time mode, reset gates 132 and 133 and preload gates 134 and 135 are maintained in the off position. The circuit defined by gates 106–120 effectively changes the state of decade counter 81 to a six pulse counter. This is required because counter 81 is counting seconds in the "tens" position.

The frequency and time modes of counter/timer circuit 58 will now be described in greater detail. First, during the frequency mode, the signal from local oscillator 53 enters on pin 60. Transistor 62 forms an input buffer, the output pulses of which goes to NOR gate 64. NOR gate 64 is enabled by the divide-by-two signal from decade counter 71 only during the count cycle of the frequency mode.

During the count cycle, NOR gate 74 passes the frequency signal to counter 76 which is used to eliminate "jitter". The output from decade counter 76 is applied to the least significant bit counter 80. The output from decade counter 80 is applied to decade counter 81 as the connecting pin goes from a one to a zero on the count of zero. The output from decade counter 81 is transferred by gates 84 and 85 to decade counter 82. Counter 82 drives binary counter 83 which controls the most significant bit. During the count cycle, the signal from the divide-by-two pin of decade counter 71 is also fed through inverter 124 to disable the gates 130–135.

In the next period, the divide-by-two pin of counter 71 disables gate 64 and enables gates 130–135 in preparation for the read, reset and preload cycles. The read, reset and preload gates 130–135 are controlled during their respective cycles by counter 70 acting through inverters 138 and 140. The read gates 130 and 131 detect the counts two and three of counter 70; the reset gates 132 and 133 respond to counts four and five; and the preload gates 134 and 135 detect the counts of eight and nine of the counter 70. During the read cycle, the combined output from gates 130 and 131 is a logic one which turns on transistor 148. The output of transistor 148 follows read line 152 to drive four-bit latches 86–88. The latches in turn drive BDC-to-seven decoders 90–92 which in turn drive displays 94–96.

The signals on read line 152 also feeds an input to binary counter 83 which is a pair of J-K flip-flops (not shown). In the frequency mode, switch 30 is connected to a 3.6 volt source so that transistor 100 is disabled and transistor 102 is enabled. A positive pulse on read line 152 causes the state of binary counter 83 to be fed to transistor 102 when counter 83 is in a logic one state. When counter 83 is in a logic zero state, transistor 102 is turned off and display device 97 is blank.

During the reset cycle, the combined output of reset gates 132 and 133 is a logic one which drives transistor 144. The output of transistor 144 follows reset line 146 to counters 80–83 resetting each counter to zero. Reset line 146 also feeds a one pulse to counter 76 resetting it to zero.

When the preload gates 134 and 135 produce a logic one, the signal is inverted through inverter 154 to turn transistor 156 off. The emitter output from transistor 156 then goes to a zero level to enable preload gates 160–167 by way of line 157. The input signal from band selector switch 20 then feeds in through transistor 176 and preload gates 160–167 to load counters 80–83 according to a predetermined band selection.

When the low band of 142 kilocycles is selected, the input from band switch 20 is one. The signal drops the output of transistor 176 to zero and enables gates 160, 161, 163 and 167. These gates then preload counters 80–83 with the count of 858, the nine's complement of 142, which indicates that the ADF system is operating on the low frequency band. At the same time, the output from transistor 176 passes through inverter 180 to disable gates 165 and 166.

When the high band is selected, the input on band 20 is zero driving the output of transistor 176 to a logic one and disabling gates 160, 161, 163 and 167. At the same time, gates 165 and 166 are enabled through inverter 180. This action preloads the count of 545 in counters 80–82 which is the nine's complement of 455 and corresponds to the high band of the ADF system. Thus, the preloading cycle, in effect, accomplishes a subtraction of 142 from the count of the low band frequency and 455 from the count of the high band frequency coming from the local oscillator.

During the time mode, the input from mode switch 32 is at a zero level which is inverted by transistor 65 to a logic one. Gate 64 is therefore disabled which stops the frequency input to gate 74. At the same time, gate 72 is enabled by way of line 31 and timing pulses from counter 71 are passed directly through gate 74 and counter 76 to decade counter 80. It should be noted that, using a one kilohertz oscillator 66, the frequency of the pulses to counter 80, after having passed through decade counters 70, 71 and 76, is one hertz (one cycle per second).

The zero input from mode switch 32 is inverted by transistor 142 to disable reset gate 132 and preload gate 134. The output of transistor 142 also enables transistor 150 which in turn drives latches 86–88 and binary counter 83. The read cycle is thus maintained on during the frequency mode to display the count of counters 80–83 as it progresses. The input from reset button 34 is connected to reset line 146. When the button is pushed to reset, line 34 goes to a logic level such as to hold all decades on zero count. When the button is again pushed to start the count, line 34 goes to level to enable the decades to again count the time pulses.

During the frequency mode, the zero input from mode switch 32 is fed through inverter 114 to disable gate 112. After decade counter 81 is reset, the inputs to inverters 106 and 108 are both zero which in turn feeds ones to both inputs of gate 110. The zero output of gate 110 overrides the one output of gate 114 and enables gate 112. The output of gate 112, in turn, disables gate 114 thus producing a logic zero at the input to gate 118. When reset line 122 is also at zero, the logic one output of gate 118 passes through inverter 120 to input a zero to decade counter 81.

When decade counter 81 reaches a count of six, the inputs to inverters 106 and 108 are both ones which in turn feeds zeros to both inputs of gate 110. The logic one output of gate 110 acts to disable gate 112 which in turn enables gate 116. The logic one output of gate 116 is fed through gates 118 and 120 to decade counter 81 resetting it to zero. The next logic one pulse from counter 80 to counters 81 also follows line 115 to disable gate 116. The output of gate 116 drops to zero, feeding a zero to counter 81. Gates 116-120 are thereby reset in preparation for the next count of six. Thus, in the time mode, decade counter 81 is converted to a six pulse counter to count seconds in the "tens" position.

From the above detailed description of a preferred embodiment of the invention, it can be seen that the radio frequency at which an ADF system is operating may be simultaneously displayed in digital form on the instrument panel 10. In this manner, one can quickly and accurately determine radio frequencies during the tuning operation. While the ADF system is operating on a particular frequency, a timing count may be displayed on instrument panel 10 using mode switch 32. A reset button 34 provides a means to set the timer to begin counting a new period. In this manner, a time period of up to 20 minutes may be quickly and accurately monitored when needed during flying procedure.

While a preferred embodiment of the invention has been described in detail, it is to be understood that various changes, substitutions and alterations can be made therein without departing from the spirit and scope of the invention as defined by the appended claims.

What is claimed is:

1. In an air navigation system, the combination comprising:
   a. an automatic direction finding receiver for receiving a radio frequency having a continuously tunable local oscillator;
   b. counter means for counting pulses;
   c. display means for digitally displaying the count of the counter means;
   d. a clock pulse generator;
   e. first logic means for directing a series of pulses to the counter means representative of the local oscillator frequency for a predetermined number of clock pulses whereby the pulses will be counted and the count displayed;
   f. second logic means for directing selected pulses from the clock pulse generator to the counter whereby time will be displayed; and
   g. manually operable logic means for selectively disabling the first logic means and enabling the second logic means, or enabling the first logic means and disabling the second logic means.

2. The combination of claim 1 further characterized by:
   a. manually operable means for selectively resetting the counter means and for selectively starting the counting means.

3. In an air navigation system the combination comprising:
   a. an automatic direction finder system having a continuously tunable receiver for receiving a radio frequency;
   b. a signal generator for producing time based pulses;
   c. gating means connected to the continuous tuning wave receiver and the signal generator for passing, in the alternative, the time based pulses or pulses representative of the radio frequency in accordance with a predetermined selection;
   d. counting means connected to the gating means for counting the pulses passed by the gating means; and
   e. display means for digitally displaying the count of the counter means.

4. In an air navigation system, the combination of:
   a. pulse counter means;
   b. means for digitally displaying the count of the counter means;
   c. a source of clock pulses;
   d. first logic means responsive to selected clock pulses for gating pulses representative of the frequency of the local oscillator of an automatic direction finder receiver to the counter means for a predetermined time period;
   e. second logic means for presetting the counter means to a count representative of the IF frequency of the automatic direction finder receiver;
   f. third logic means for gating selected clock pulses to the counter means;
   g. manually operable mode select logic means for selectively and alternatively
      1. enabling the first and second logic means and disabling the third logic means, or
      2. enabling the third logic means and disabling the first and second logic means; and
   h. manually operable start-reset logic means for selectively and alternatively placing the counter in a reset state or in a count state.

5. The combination of claim 4 wherein:
   the mode select logic means includes a two position switch; and
   the start-reset logic means includes a push-on, push-off button switch.

6. In an aircraft navigation system, the combination of:
   a. clock pulse means for providing a series of time pulses during a time mode and for identifying successive read, reset, preload and count cycles during a frequency mode;
   b. three decade pulse counters connected in series;
   c. a binary pulse counter connected in series with the third decade pulse counter;
   d. a mode gating circuit connected between the clock generator and the first decade pulse counter for gating, alternatively, time based pulses or pulses representative of the local oscillator frequency of an ADF receiver to the decade counters and binary counter in accordance with a predetermined selection of the time mode or the frequency mode, respectively;
   e. a reset gating circuit for setting the decade pulse counters and the binary pulse counters to zero at the start of the time and frequency modes and during the reset cycle of the frequency mode;
   f. a preload gating circuit for setting the decade pulse counters to a predetermined count to subtract the IF frequency of the ADF receiver from the count of the decade pulse counters and binary pulse counter during the count cycle of the frequency mode;

g. digital display means connected to each of the decade pulse counters and to the binary pulse counter for storing the output signals of the decade pulse counters and the binary pulse counter during a read cycle and digitally displaying the count of each counter;

h. a read gating circuit connected to the decade pulse counters and the binary pulse counter for transferring the count of the counters to the respective digital display means during the read cycle of the frequency mode and during the time mode; and i. logic means for converting the second decade pulse counter to a six pulse counter during the time mode.

* * * * *